(12) United States Patent
Kim

(10) Patent No.: US 7,293,349 B2
(45) Date of Patent: Nov. 13, 2007

(54) INSPECTION DEVICE FOR ENGINE ROOM

(75) Inventor: Oh-Young Kim, Gwangmyeong-si (KR)

(73) Assignee: Kia Motors Corporation, Seoul (KR)

( * ) Notice: Subject to any disclaimer, the term of this patent is extended or adjusted under 35 U.S.C. 154(b) by 211 days.

(21) Appl. No.: 10/916,245

(22) Filed: Aug. 11, 2004

(65) Prior Publication Data

US 2005/0081371 A1    Apr. 21, 2005

(30) Foreign Application Priority Data

Oct. 20, 2003   (KR) ...................... 10-2003-0073002

(51) Int. Cl.
*B25B 27/14*      (2006.01)

(52) U.S. Cl. .................. 29/700; 29/559; 29/281.1; 29/281.4; 269/37; 269/55; 269/86; 269/909

(58) Field of Classification Search ............. 29/888.01, 29/464, 466, 468, 407.09, 407.1, 700, 705, 29/559, 281.1, 281.4; 269/37, 45, 55, 86, 269/156, 289 R, 909; 73/865.8
See application file for complete search history.

(56) References Cited

U.S. PATENT DOCUMENTS

| | | | | |
|---|---|---|---|---|
| 1,673,943 A | * | 6/1928 | Herr | ........................ 29/888.01 |
| 6,811,131 B2 | * | 11/2004 | Kuo | ...................... 248/346.03 |
| 2003/0034602 A1 | * | 2/2003 | Kavanaugh | .................. 269/45 |

FOREIGN PATENT DOCUMENTS

| | | | |
|---|---|---|---|
| JP | 62163878 A | * | 7/1987 |
| JP | 03092458 A | * | 4/1991 |
| JP | 09-290697 | | 11/1997 |
| JP | 11-230866 | | 8/1999 |

* cited by examiner

*Primary Examiner*—Jermie E. Cozart
(74) *Attorney, Agent, or Firm*—Morgan Lewis & Bockius LLP

(57) ABSTRACT

Various models of engines and transmissions can be installed in an engine room model in a relatively easy manner. As a result, efficiency of inspecting the engine room is optimized by using the engine room model and various potential problems which may occur in a mass production of vehicles are discovered and can be prevented in advance.

9 Claims, 5 Drawing Sheets

INSPECTION DEVICE FOR ENGINE ROOM

CROSS-REFERENCE TO RELATED APPLICATIONS

This application claims priority to Korean Application No. 10-2003-0073002, filed on Oct. 20, 2003, the disclosure of which is incorporated by reference herein in its entirety.

TECHNICAL FIELD OF THE INVENTION

Generally, the present invention relates to a device for inspecting a condition of an engine room of a vehicle. More particularly, the present invention is adapted to practically and visually check for interference of components of the engine room or the like by installing an engine and transmission in an engine room model.

BACKGROUND OF THE INVENTION

Typically, the disposition of various components within an engine room should take into consideration their physical, thermodynamic, hydrodynamic, and electrical properties. Accordingly, these considerations can preferably be inspected utilizing an engine room model in the design step of designing a vehicle. However, a drawback of current inspection devices is that and engine and transmission can not be installed together and inspected in the conventional engine room model.

SUMMARY OF THE INVENTION

An embodiment of the present invention is provided to install various models of engines and transmissions in an engine room model in a relatively easy manner. Thereby optimizing the efficiency of inspecting the engine room via the engine room model. As a result, various potential problems are prevented from occurring in advance during mass production of vehicles.

An inspection device for an engine room comprises a rear model for representing the dash panel side of the engine room. Two side models are disposed at both sides of the rear model and represent the fender apron panel sides of the engine room. A frontal model represents the front of the engine room. A longitudinally moving means changes the interval between the rear model and the frontal model. A transversely moving means changes the interval between the two side models. A carrier is integrally connected with the frontal model and moves towards the space between the frontal model, rear model, and side models. The carrier is provided with mount installing parts for installing the engine and the transmission.

BRIEF DESCRIPTION OF THE DRAWINGS

For a better understanding of the nature and objects of the present invention, reference should be made to the following detailed description, read in conjunction with the accompanying drawings, in which.

DETAILED DESCRIPTION OF THE PREFERRED EMBODIMENTS

Figure 1:
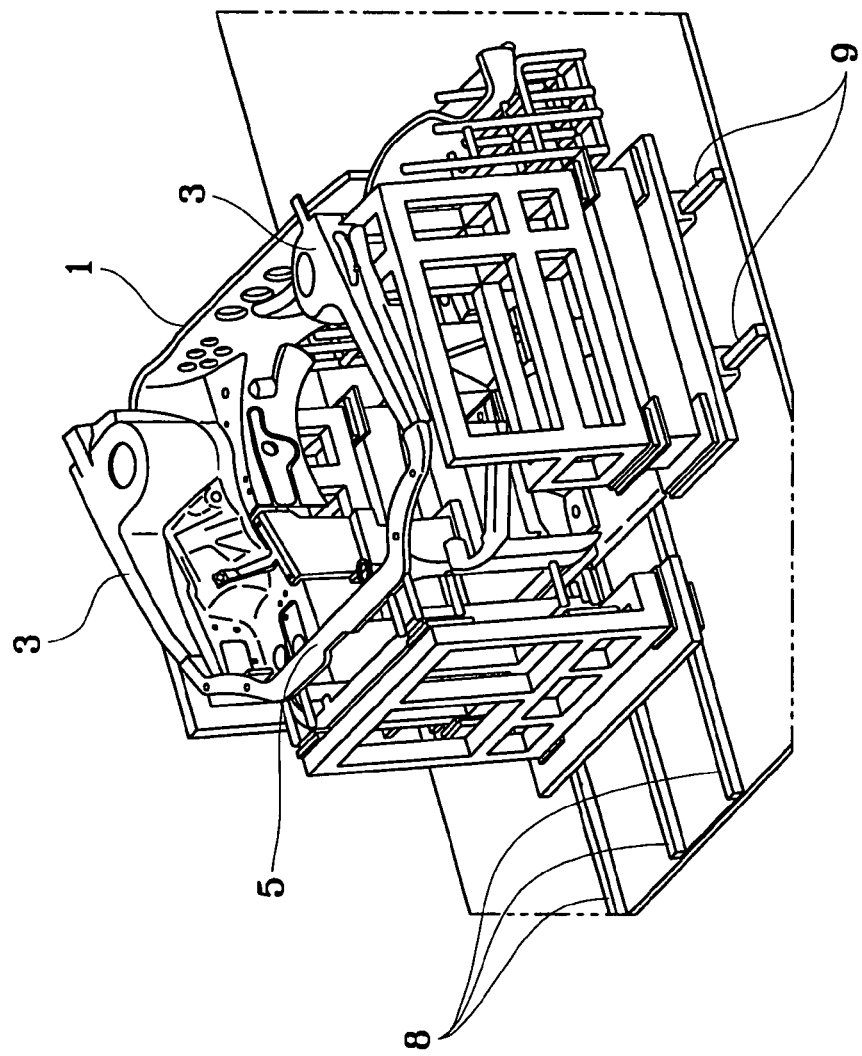
FIG. 1 shows a perspective view of an inspection device for an engine room according to an embodiment of the present invention.
Figure 2:
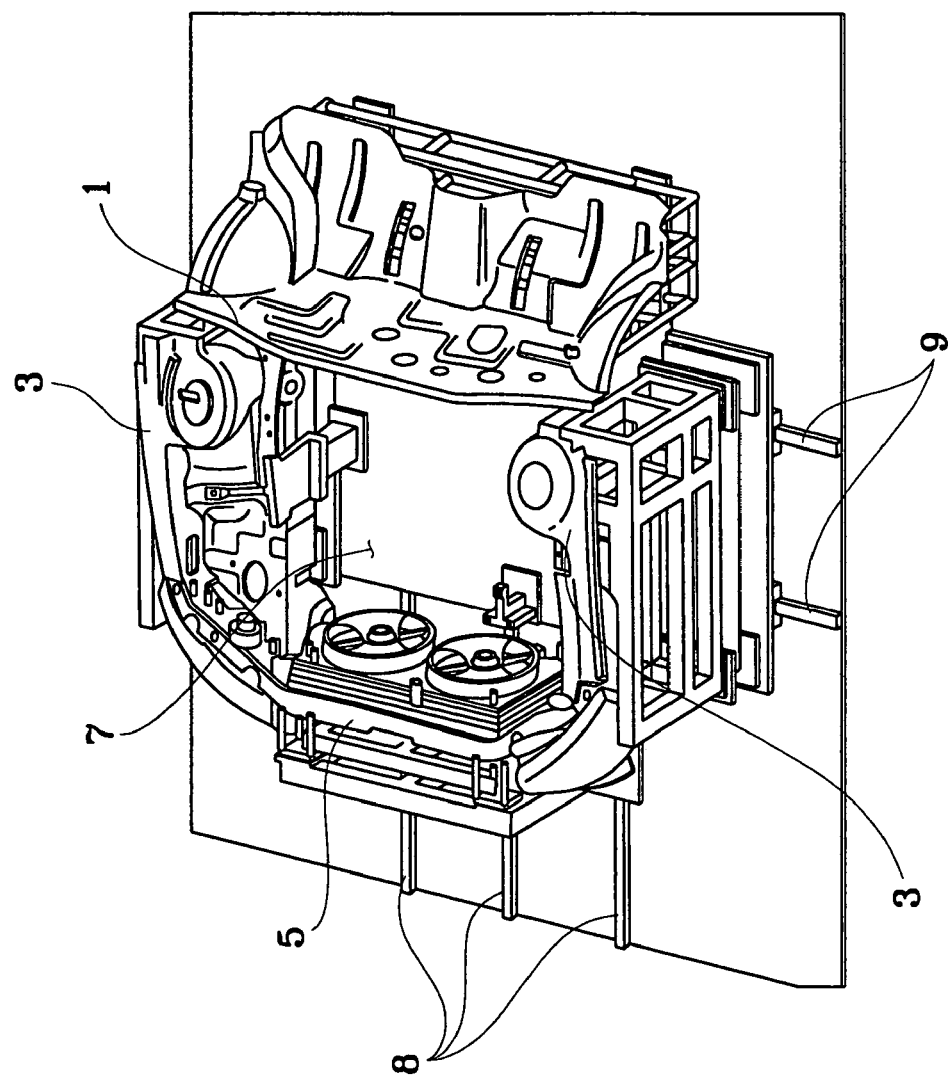
FIG. 2 shows a perspective view of another inspection device for an engine room according to another embodiment of the present invention.
Figure 3:
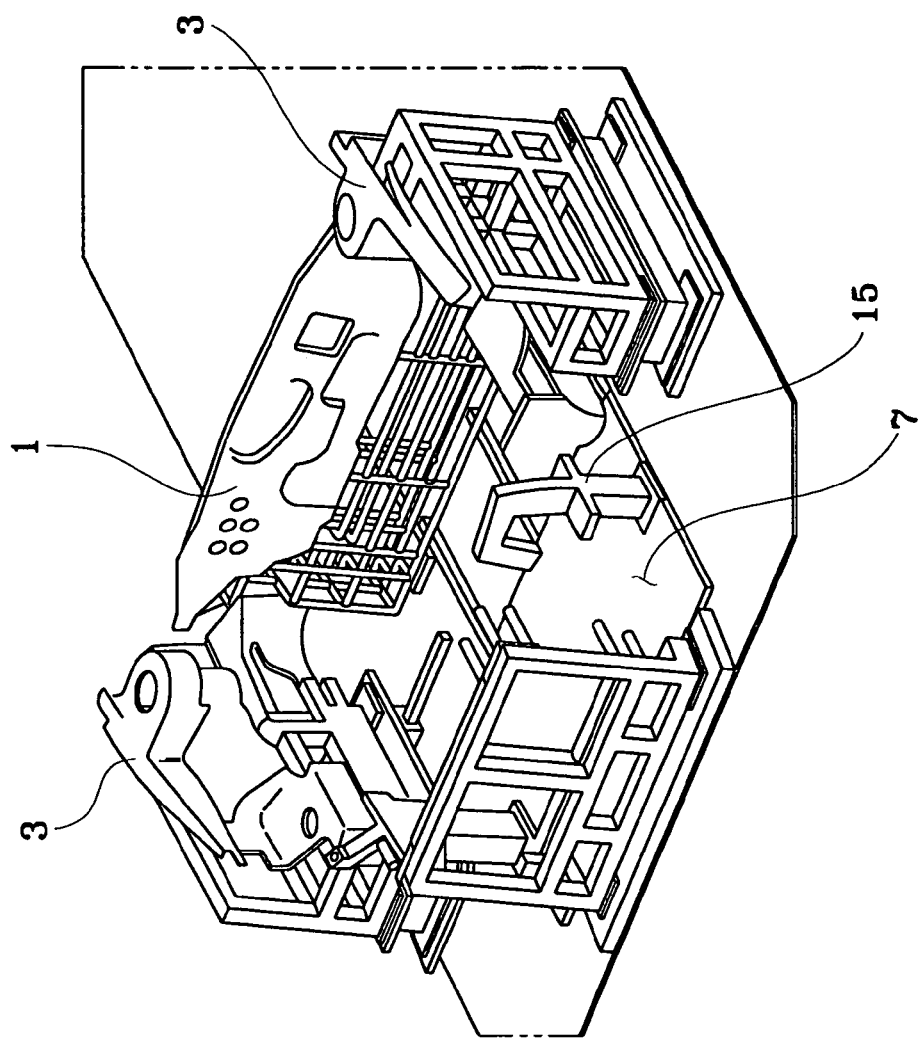
FIG. 3 illustrates side models, a frontal model, and a carrier distantly placed from a rear model of an inspection device for an engine room according to yet another embodiment of the present invention.
Figure 4:
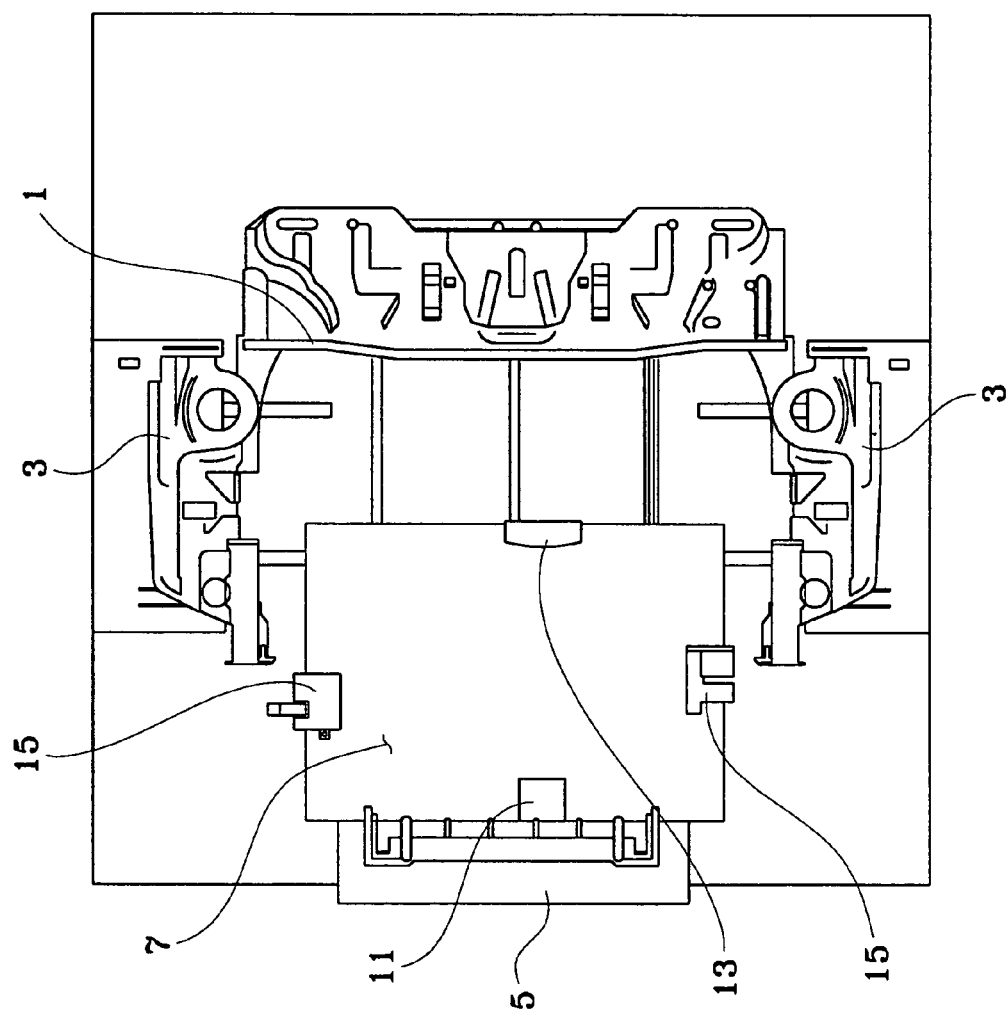
FIG. 4 is a plan view of FIG. 3.

Referring to FIGS. 3 and 4, an inspection device for an engine room includes a rear model 1 for representing the dash panel side of the engine room. Two side models 3 are disposed at both sides of the rear model 1 and represent the fender apron panel sides of the engine room. A frontal model 5 represents the front of the engine room. A longitudinally moving means changes the interval between the rear model 1 and the frontal model 5. A transversely moving means changes the interval between the two side models 3. A carrier 7 is configured to integrally be connected with the frontal model 5 and to move towards the space between the frontal model 5, rear model 1, and side models 3. The carrier 7 is provided with mount installing parts for installing the engine and the transmission.

With reference to FIGS. 1-5, the longitudinally moving means is preferably a linear motion (LM) guide 8 equipped at lower sides of the front model 5 and carrier 7 for allowing the frontal model 5 and the carrier 7 to linearly move in relation to the rear model 1. The transversely moving means is a linear motion (LM) guide 9 equipped at lower sides of each side model 3 for allowing the side model 3 to linearly move in relation to each other.

The carrier 7 is equipped with a front mount installing part 11 for installing a front roll mount. The carrier 7 is also equipped with a rear mount installing part 13 for installing a rear roll mount. Each of the side models 3 includes a mount installing part, which is a cut-off portion to install the engine and transmission. Side mount installing parts 15 are provided on the carrier 7 for corresponding to the cut-off mount installing part of the side models 3. Accordingly, the engine and transmission may completely be installed on the carrier 7 regardless of the side models 3.

Operation of an embodiment of the present invention will now be described with reference to the drawings. In order to install an engine and transmission into the engine room of FIGS. 1 and 2, the side models 3 move via the LM guide 9 so as to distantly be placed from each other. Then, the frontal model 5 and carrier 7 shift towards the front direction of the rear model 1 via the LM guide 8, thereby forming the engine room model of FIGS. 3 and 4.

Figure 5:
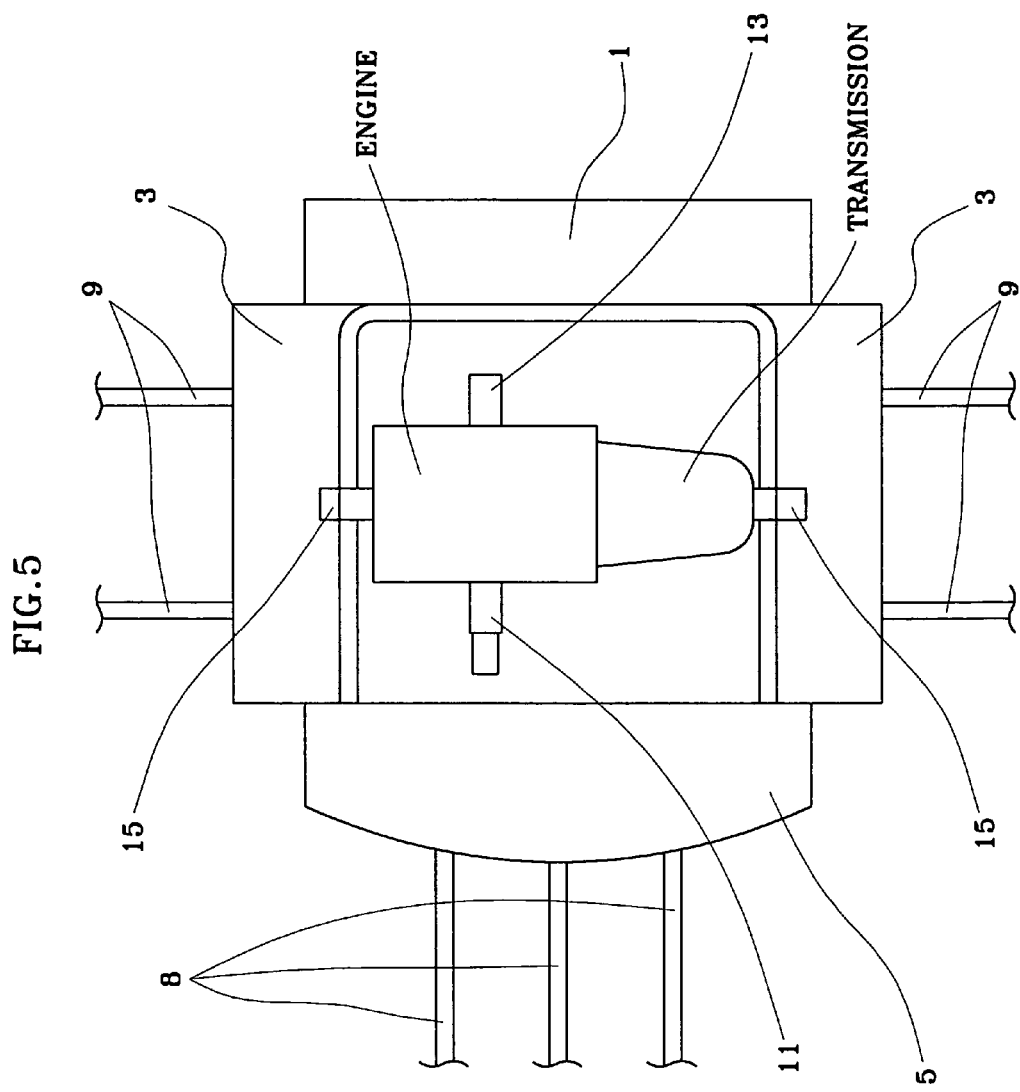
FIG. 5 illustrates an engine room fully installed with an engine and transmission according to an embodiment of the present invention.

The engine and transmission are installed by the two side mount installing parts 15, front mount installing part 11, and rear mount installing part 13 provided at the carrier 7. When the engine and transmission are mounted on the carrier 7, the carrier 7 and frontal model 5 move via the LM guide 8 towards the rear model 1. Then, the side models 3 distantly placed from each other shift via the LM guide 9 to a location where the frontal model 5, carrier 7 and rear model 1 are gathered, thereby forming a complete engine room model, as shown in FIG. 5.

Thus, any interference caused between components or the like in the engine room thus embodied can be discovered, thereby optimizing the efficiency of inspecting the engine room by using the engine room model. The engine and transmission used in the embodiment of the present invention can be applied with other models.

It will be appreciated by one of ordinary skill in the art that various models of engines and transmissions can practically be placed in the engine room model in a relatively easy manner. Therefore, inspection efficiency of the engine room is optimized and various potential problems can be discovered and prevented in advance, thereby streamlining and making more efficient a mass production of vehicles.

What is claimed is:

1. An inspection device for an engine room, said device comprising:
   a rear model of a dash panel side of said engine room;
   two side models of fender apron panel sides of said engine room, disposed at both sides of said rear model;
   a frontal model of a front of said engine room;
   longitudinally moving means for changing an interval between said rear model and said frontal model;
   transversely moving means for changing an interval between said two side models; and
   a carrier configured to integrally be connected to said frontal model and to move towards a space between said frontal model, rear model and side models, wherein said carrier is provided with mount installing parts for installing an engine and a transmission.

2. The inspection device as defined in claim 1, wherein said longitudinally moving means is a linear motion guide equipped at lower sides of said frontal model and said carrier for allowing said frontal model and said carrier to linearly move in relation to said rear model.

3. The inspection device as defined in claim 1, wherein said transversely moving means is a linear motion guide equipped at lower sides of each said side model for allowing said side models to linearly move in relation to each other.

4. The inspection device as defined in claim 1, wherein each said side model has a mount installing portion, said mount installing portion being a cut-off portion to mount said engine and said transmission; and
   said carrier is provided with side mount installing parts for corresponding to said mount installing portion.

5. The inspection device as defined in claim 4, wherein said carrier includes:
   a front mount installing part for installing a front roll mount; and
   a rear mount installing part for installing a rear roll mount.

6. An inspection device for an engine room, said device comprising:
   a rear model having a shape of a dash panel side of said engine room;
   two side models having shapes offender apron panel sides of said engine room, disposed at both sides of said rear model;
   a frontal model having a shape of a front of said engine room;
   transversely moving means for changing an interval between said two side models;
   a carrier configured to integrally be connected to said frontal model and to move towards a space between said frontal model, rear model and side models, wherein said carrier is provided with mount installing parts for installing an engine and a transmission; and
   a first linear motion guide equipped at lower sides of said frontal model and said carrier for allowing said frontal model and said carrier to linearly move in relation to said rear model.

7. The inspection device as defined in claim 6, wherein said transversely moving means is a second linear motion guide equipped at lower sides of each said side model for allowing said side models to linearly move in relation to each other.

8. The inspection device as defined in claim 6, wherein each said side model has a mount installing portion, said mount installing portion being a cut-off portion to mount said engine and said transmission; and
   said carrier is provided with side mount installing parts for corresponding to said mount installing portion.

9. The inspection device as defined in claim 8, wherein said carrier includes:
   a front mount installing part for installing a front roll mount; and
   a rear mount installing part for installing a rear roll mount.

* * * * *